US012748622B2

(12) United States Patent
Rosemarine et al.

(10) Patent No.: US 12,748,622 B2
(45) Date of Patent: Sep. 29, 2026

(54) LOCATING DATA IN STORAGE

(71) Applicant: Arm Limited, Cambridge (GB)

(72) Inventors: Elliot Maurice Simon Rosemarine, London (GB); Alexander Eugene Chalfin, Mountain View, CA (US); Rune Holm, Oslo (NO)

(73) Assignee: Arm Limited, Cambridge (GB)

( * ) Notice: Subject to any disclaimer, the term of this patent is extended or adjusted under 35 U.S.C. 154(b) by 924 days.

(21) Appl. No.: 18/099,588

(22) Filed: Jan. 20, 2023

(65) Prior Publication Data

US 2024/0248753 A1 Jul. 25, 2024

(51) Int. Cl.
*G06F 9/48* (2006.01)

(52) U.S. Cl.
CPC .................................. *G06F 9/4881* (2013.01)

(58) Field of Classification Search
CPC .................................................... G06F 9/4881
See application file for complete search history.

(56) References Cited

U.S. PATENT DOCUMENTS 5,386,524 A * 1/1995 Lary .................. G06F 12/0292 711/208
2015/0269180 A1 9/2015 Chen et al.
2018/0121796 A1* 5/2018 Deisher .................. G06N 3/045
2020/0104690 A1 4/2020 Bai et al.
2021/0200437 A1 7/2021 Li et al.
2022/0138551 A1 5/2022 Marani et al.
2023/0072082 A1* 3/2023 Kadri .................. G06N 3/0464

OTHER PUBLICATIONS

UKIPO Search Report dated Aug. 6, 2024 for GB Application No. GB2400300.6.

* cited by examiner

*Primary Examiner* — Wissam Rashid
(74) *Attorney, Agent, or Firm* — EIP US LLP

(57) ABSTRACT

A processor to: receive a task to be executed, the task comprising a task-based parameter associated with the task, for use in determining a position, within an array of data descriptors, of a particular data descriptor of a particular portion of data to be processed in executing the task. Each of the data descriptors in the array of data descriptors has a predetermined size and is indicative of a location in a storage system of a respective portion of data. The processor derives, based on the task, array location data indicative of a location in the storage system of a predetermined data descriptor, and obtains the particular data descriptor, based on the array location data and the task-based parameter. The processor obtains the particular portion of data based on the particular data descriptor and processes the particular portion of data in executing the task.

20 Claims, 3 Drawing Sheets

LOCATING DATA IN STORAGE

BACKGROUND

Technical Field

The present invention relates to methods, processors, and non-transitory computer-readable storage media for locating data in storage.

Description of the Related Technology

Certain data processing techniques, such as neural network processing and graphics processing, involve the processing and generation of considerable amounts of data. In order to efficiently implement a particular processing operation, such as a data-intensive processing operation, it is desirable to be able to identify a location within the storage of the data to be processed in an efficient manner.

SUMMARY

According to a first aspect of the present invention, there is provided a processor to receive a task to be executed, the task comprising a task-based parameter associated with the task, for use in determining a position, within an array of data descriptors, of a particular data descriptor of a particular portion of data to be processed in executing the task, wherein each of the data descriptors in the array of data descriptors has a predetermined size and is indicative of a location in a storage system of a respective portion of data; derive, based on the task, array location data indicative of a location in the storage system of a predetermined data descriptor of the array; obtain the particular data descriptor from the storage system, based on the array location data and the task-based parameter; obtain the particular portion of data from the storage system, based on the particular data descriptor; and process the particular portion of data in executing the task.

According to a second aspect of the present invention, there is provided a computer-implemented method comprising: receiving a task to be executed, the task comprising a task-based parameter associated with the task, for use in determining a position, within an array of data descriptors, of a particular data descriptor of a particular portion of data to be processed in executing the task, wherein each of the data descriptors in the array of data descriptors has a predetermined size and is indicative of a location in a storage system of a respective portion of data; deriving, based on the task, array location data indicative of a location in the storage system of a predetermined data descriptor of the array; obtaining the particular data descriptor from the storage system, based on the array location data and the task-based parameter; obtaining the particular portion of data from the storage system, based on the particular data descriptor; and processing the particular portion of data in executing the task.

According to a third aspect of the present invention, there is provided a non-transitory computer-readable storage medium comprising a set of computer-readable instructions stored thereon which, when executed by at least one processor, are arranged to cause the at least one processor to: receive a task to be executed, the task comprising a task-based parameter associated with the task, for use in determining a position, within an array of data descriptors, of a particular data descriptor of a particular portion of data to be processed in executing the task, wherein each of the data descriptors in the array of data descriptors has a predetermined size and is indicative of a location in a storage system of a respective portion of data; derive, based on the task, array location data indicative of a location in the storage system of a predetermined data descriptor of the array; obtain the particular data descriptor from the storage system, based on the array location data and the task-based parameter; obtain the particular portion of data from the storage system, based on the particular data descriptor; and process the particular portion of data in executing the task.

BRIEF DESCRIPTION OF THE DRAWINGS

Further features will become apparent from the following description of examples, which is made with reference to the accompanying drawings.

DETAILED DESCRIPTION

Figure 1:
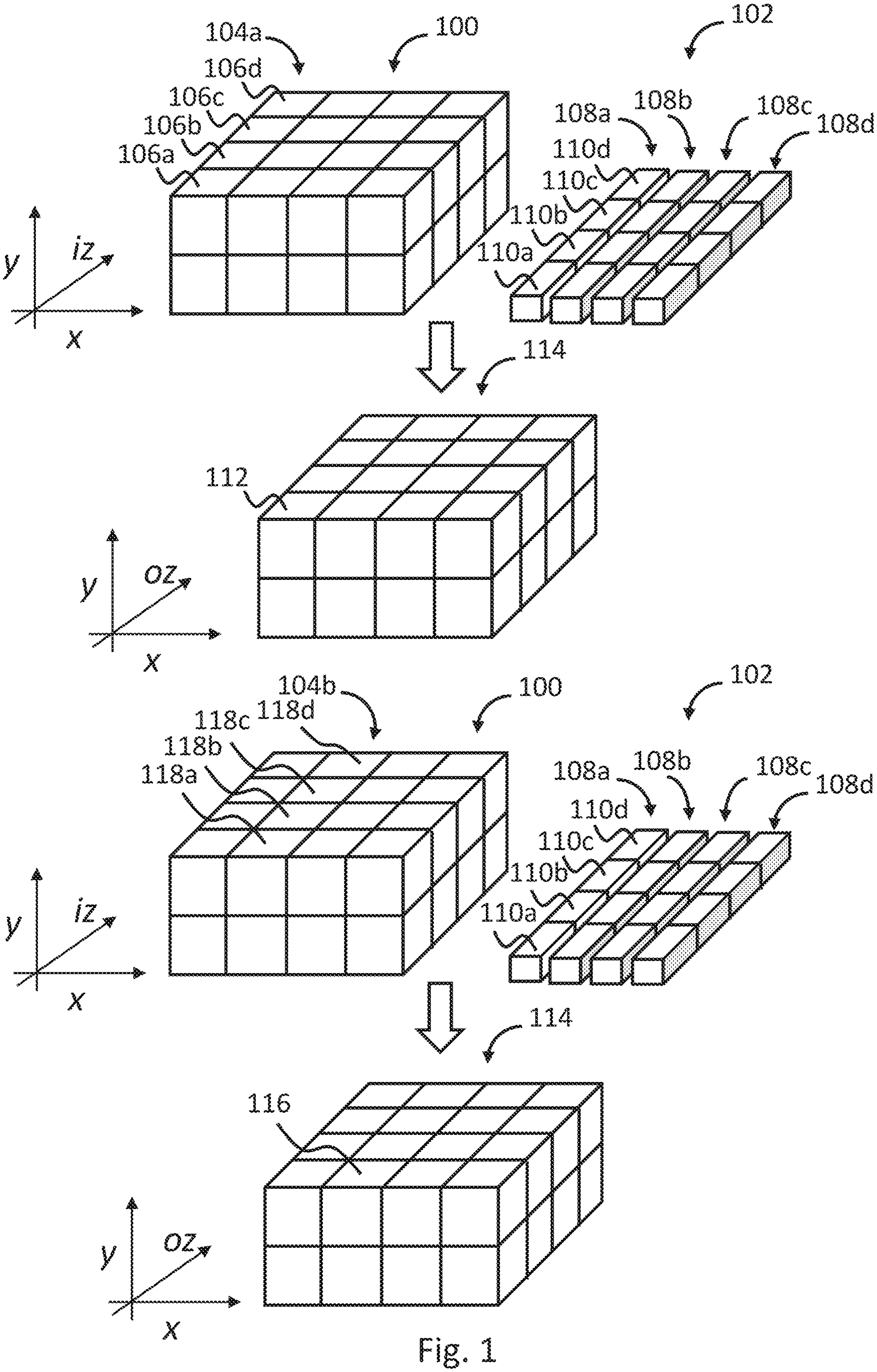
FIG. 1 is a schematic representation of a convolution of part of a tensor with neural network weights, according to examples.

First examples herein relate to a processor to receive a task to be executed, the task comprising a task-based parameter associated with the task, for use in determining a position, within an array of data descriptors, of a particular data descriptor of a particular portion of data to be processed in executing the task, wherein each of the data descriptors in the array of data descriptors has a predetermined size and is indicative of a location in a storage system of a respective portion of data. The processor is configured to derive, based on the task, array location data indicative of a location in the storage system of a predetermined data descriptor of the array. The particular data descriptor is obtained by the processor from the storage system, based on the array location data and the task-based parameter. The processor then obtains the particular portion of data from the storage system, based on the particular data descriptor, and processes the particular portion of data in executing task.

The array location data and the task-based parameter for example allow the particular data descriptor for a particular portion of data to be obtained for a given task. The task-based parameter can be used to determine the position, within an array of data descriptors, of a particular data descriptor corresponding to the particular portion of data. The array location data indicates a location in a storage system of a predetermined data descriptor of the array. The location is for example at least one address within the storage system within which the predetermined data descriptor is stored. For example, as each of the data descriptors has a predetermined size, the location may be a predetermined address within a set of addresses storing the predetermined data descriptor, such as a start address at which storage of the predetermined data descriptor begins. As the location of the predetermined data descriptor in the storage system is known (which may e.g. correspond with the start of the array of data descriptors), and the size of each of the data descriptors and the index of a particular data descriptor for a given task are also known, the location of the particular data descriptor in the storage system can, in turn, be straightforwardly determined. The particular data descriptor is indicative of a location in the storage system of the particular portion of data, and thus allows the particular portion of the data itself to be obtained from that location.

This approach for example provides flexibility for executing the task, allowing particular portions of data to be accessed at will, even if they have not previously been read before. For example, a given portion of data can be accessed by different respective cores of a multi-core processor without each core having to read prior portions of the data in a data stream.

The portion of data may be a portion of a compressed data stream, which is compressed losslessly, causing a variable rate of encoding. For example, the compressed data stream may represent neural network weights, which are static and unchanging, and may be used for multiple instances of neural network inferencing (discussed further below). Given the repeated re-use of the neural network weights, it is desirable to compress the neural network weights as much as possible. However, more aggressive compression tends to lead to a greater variance in the rate of encoding. In some cases, the neural network weights may be converted from a training format, such as fp32, to an inference format, such as int8, using a lossy quantization process, which can be accounted for during training and testing of the neural network. However, the neural network weights at time of inference are compressed in a lossless manner, as introducing loss at inference cannot be compensated for by training and would provide unpredictable results. Due to the variability in compression rate due to the lossless compression, it is typically impractical to keep track of a precise location within the compressed data stream of individual weights for respective tasks, and communicate this to the processor. One solution to this is to spread blocks of weights out within the compressed data stream in a predictable manner. For example, each N weights (such as each 1024 weights), the weights realign is if there was no compression. So, if there are 2048 int8 weights (where each value is a byte) and an average compression rate of 75%, then the first 1024 weights would be packed into the first 256 bytes, there would then be a 768 byte gap in the compressed data stream and then the second 1024 weights would begin. This would allow the relevant block of 1024 weights to be located in a predictable manner, as it would be possible to go straight to the start of a particular block to be processed without having to process prior block(s). However, compressing the compressed data stream in this manner does not reduce the footprint in memory of the compressed data stream.

The examples herein instead utilize the predetermined size of each of the data descriptors to provide this predictability in a similar manner, while facilitating greater compression of the data. For example, if each data descriptor has a size of 32 bytes, the data descriptors can be indexed appropriately and used to provide a specific address within a tightly packed compressed data stream, e.g. corresponding to a particular portion of data that has been losslessly compressed such as a particular set of neural network weights. For example, data to be compressed may be separated out into different compressed data streams during compression, each associated with a different data descriptor, to avoid having to access compressed data within the middle of a stream, such as a stream compressed using variable rate encoding. This allows the compressed stream, or each separate compressed stream, to occupy a reduced footprint in memory (reduced approximately equivalently to the rate of compression), while maintaining the addressability into different portions of the stream.

In some examples, the processor is to execute a plurality of tasks comprising the task, each task comprising processing of a different respective portion of data, each respective portion of data represented by a data descriptor at a different respective position within the array, and the task-based parameter is representative of the position within the array of the particular data descriptor of the particular portion of data to be processed in executing the task. In these examples, the task-based parameter for example facilitates easy access to a particular data descriptor for a particular portion of data to be processed for a given task. This for example allows the same control instructions to be used to control execution of a number of different tasks, e.g. using different task-based parameters as an input to the control instructions in order to access different data descriptors for different tasks, so as to obtain different portions of data for processing. This can for example reduce the amount of control data to be generated and stored compared to other approaches that require different control instructions for different tasks.

In some examples, the processor comprises a command processing unit to: divide a job to be executed into a plurality of tasks comprising the task; determine a job-based parameter associated with the job, for use in conjunction with the task-based parameter in determining the position within the array of the particular data descriptor of the particular portion of data to be processed in executing the task; and issue the task to a processing module of the processor, the task further comprising the job-based parameter, wherein the processing module is to obtain the particular data descriptor from the storage system based on the array location data, the task-based parameter, and the job-based parameter. This for example allows appropriate data descriptors to be accessed in a straightforward manner for different jobs. In a similar manner to use of the task-based parameter, the job-based parameter for example allows the same control instructions to be used to control execution of different jobs, e.g. using different job-based parameters as an input to the control instructions in order to access different data descriptors for different jobs, so as to obtain different portions of data for processing. This can for example reduce the amount of control data to be generated and stored compared to other approaches that require different control instructions for different jobs. Use of the task-based and job-based parameters for example allows the same main program description to be used for various different tasks and jobs, with only the value of the task-based and job-based parameters provided as an input to the main program description needing to change for a given task and job. As the main program description is the same for various tasks and jobs, it can be cached and re-used for subsequent tasks and jobs executed on the same core or a different core (e.g. if the processor is a multi-core processor).

In some examples, the processor is to execute a plurality of jobs comprising the job, each job comprising processing of a different respective section of the data, each respective section of the data corresponding to a respective task of the plurality of tasks and comprising a different set of portions of data, wherein each set of portions of data is represented by a set of data descriptors at a different respective set of positions within the array, and the job-based parameter is representative of a job start position within the array of a data descriptor of a portion of data to be processed to start execution of the job. Use of a job-based parameter representing a job start position within the array of the data descriptor of the portion of the data to be processed to start execution of the job for example allows the data descriptor for this data to be easily identified.

The task-based parameter may be representative of an index of the task in the plurality of tasks of the job. This for example further facilitates the identification of a position with the array of a particular data descriptor corresponding to a particular task of a job, so that the particular data descriptor can be easily obtained.

In some examples, to obtain the data descriptor from the storage, the processing module is to determine the position within the array of the particular data descriptor of the particular portion of data by combining the job start position with the index. This for example allows the position to be straightforwardly calculated by a combination of both task-based and job-based information.

In some examples, the command processing unit is to: receive, from a host processor, a command to cause the job to be executed, the command comprising: a first parameter for determining the task-based parameter; and a second parameter for determining the job-based parameter. This for example allows the task-based and job-based parameters to be determined from first and second parameters provided by the host processor, which facilitates use of the same control instructions (e.g. included in the command or generated in response to the command) to implement processing for different tasks and/or jobs. This allows the same control instructions to be re-used for different tasks and/or jobs, which can reduce storage and bandwidth requirements for storing and transmitting control instructions.

In some examples, the processing module is a first processing module for executing tasks of a first task type generated by the command processing unit and the processor comprises: a plurality of compute units, wherein at least one of the plurality of compute units comprises: the first processing module; a second processing module for executing tasks of a second task type, different from the first task type, generated by the command processing unit; and a local cache shared by at least the first processing module and the second processing module, wherein the command processing unit is to issue the plurality of tasks to at least one of the plurality of compute units, and the at least one of the plurality of compute units is to process at least one of the plurality of tasks. This for example enables the issuance of tasks to different processing modules, which improves the efficiency and resource usage of the processor and reduces component size. For example, tasks can be issued to processing modules that are optimized for performance of a given task type.

In some examples, the first task type is a task for undertaking at least a portion of a graphics processing operation forming one of a set of pre-defined graphics processing operations which collectively enable the implementation of a graphics processing pipeline, and wherein the second task type is a task for undertaking at least a portion of a neural processing operation. This for example enables graphics and neural processing to be performed efficiently.

In some examples, the processor comprises a plurality of processor cores, each to execute a different task of a plurality of tasks comprising the task, each of the plurality of tasks comprising processing of a different respective portion of data, each respective portion of data represented by a data descriptor at a different respective position within the array. In this way, tasks can be parallelized, i.e. so that at least two tasks are executed at least partly at the same time by different processor cores, which for example allows the tasks to be executed more efficiently.

In some examples, the particular portion of data is a particular portion of compressed data, and the processing module is to decompress the particular portion of data obtained from the storage system. Compressed data can for example be stored in a smaller storage than uncompressed data, and can be transmitted with lower bandwidth. The approaches herein allow a particular portion of the compressed data to be accessed easily, without requiring prior knowledge of the exact address of a start of the particular portion in the storage. Instead, the particular portion can be obtained using a data descriptor obtained using the methods herein, which data descriptor may be pre-defined.

The task may comprise at least a portion of a neural processing operation. In these examples, the data may comprise weight data representing neural network weights. The methods herein may thus be used to aid in efficient implementation of a neural processing operation, for example to easily locate weight data for a particular operation.

In some examples, the task comprises program location data indicative of a location in the storage system of a compiled program to be executed by the processor to execute the task. This for example allows the processor to easily obtain the compiled program, which can for example remain in the storage system so it can be re-used for at least one further task and/or job.

In some examples, the processor is to re-use the compiled program to execute a plurality of jobs, each comprising processing a different respective section of data stored in the storage system. This can for example reduce usage of processing and bandwidth resources by obviating the need to re-compile the program for each different job and to re-send the re-compiled program to the processor.

In some examples, the processor is to: obtain the compiled program from the storage system, based on the program location data; and obtain the array location data from the compiled program. In this way, the array location data can for example be pre-defined, and included in the complied program, so that the program need not be re-compiled each time a different data descriptor is to be obtained. Instead, different data descriptors at different positions within the array can be identified e.g. based on a task-based parameter and, in some cases, a job-based parameter, and their location in the storage system can be obtained based on the array location data.

To put the examples herein into context, an example of a task comprising convolution of part of a tensor 100 with neural network weights 102 will be described with reference to FIG. 1. However, it is to be appreciated that the examples herein may equally be applied to other types of task, such as other neural network processing or other tasks that do not involve a neural network.

As used herein, the term "tensor" is to be considered to refer to a multi-dimensional tensor. A tensor is an array of elements, such as an array of same-typed scalar elements. In the example of FIG. 1, a tensor 100 is convolved with neural network weights 102 (which may be referred to herein merely as "weights" for brevity) in executing a task, which in this example is a neural processing task. Neural networks can be used for processes such as machine learning, computer vision, and natural language processing operations. A neural network may operate upon suitable input data (e.g. such as an image or sound data, which may be in the form of a tensor such as the tensor 100 of FIG. 1) to ultimately provide a desired output (e.g. an identification of an object within an image, or a spoken word within a sound clip, or other useful output inferred from the input data). This process is usually known as "inferencing" or "classification." In a graphics (image) processing context, neural network processing may also be used for image enhancement ("de-noising"), segmentation, "anti-aliasing," super-sampling, etc., in which case a suitable input image (e.g. represented as a tensor) may be processed to provide a desired output image (which may also be represented as a tensor).

A neural network will typically process the input data according to a network of operators, each operator performing a particular operation. The operations will generally be performed sequentially to produce desired output data (e.g. a classification based on the image or sound data). Each operation may be referred to as a "layer" of neural network processing. Hence, neural network processing may comprise a sequence of "layers" of processing, such that the output from each layer is used as an input to a next layer of processing. Each layer for example processes an input feature map by convolving the input feature map with a set of weights to generate an output feature map, which is used as the input feature map for the next layer. The term "feature map" is used generically herein to refer to either an input feature map or an output feature map. FIG. 1 shows schematically the processing of a particular layer of a neural network according to example, in which the tensor 100 represents an input feature map.

The weights of a neural network are for example a static data set, obtained before the inferencing is performed by a training process. The weights may thus be re-used for multiple instances of inferencing, e.g. for multiple different input feature maps. In contrast, the tensor 100 is provided at run-time, and will vary depending on the input data for which the inferencing is to be performed. As the weights are static and re-useable, it is desirable to compress the weights to reduce the resources required for storage of and access to the weights. For example, lossless compression may be used to compress the weights to improve reproducibility and accuracy (although it is to be appreciated that a lossy quantization may be applied before lossless compression).

In order to efficiently implement neural network processing, examples herein may involve dividing the processing to be performed into smaller operations, each performed on a subset of data to be processed, before subsequently combining each of the outputs to obtain an overall output. For example, a tensor representing an input feature map which is to undergo inferencing may be split into stripes (which are e.g. portions of the tensor with a limited size in one dimension and an unlimited size in each other dimension). Each stripe may be taken to correspond to a job. A determination of how to efficiently divide a tensor into stripes may be performed by a compiler of a data processing system comprising a processor to perform at least part of the neural network processing. A handling unit of the processor may then further divide a job into tasks. If the processor is a multi-core processor, there may be one task per core. The handling unit, or another suitable unit of the processor, may then divide each task into blocks of work. Each block of work may for example correspond to a block of a stripe of a tensor. In these examples, each task may thus be considered to correspond to a different set of blocks, respectively. In examples such as this, the division of the job is performed by the processor, e.g. in hardware. However, the size of the tasks and blocks may be determined by the compiler. These sizes may be used by the compiler when compressing the weights, so that the weights are compressed in blocks in an appropriate order to match the order in which the blocks of the tensor are to be processed. In general, a task may be considered to correspond to processing to be undertaken to achieve a particular aim. Tasks may be defined at various levels of specificity in various examples. For example, while in this case a task involves the processing of a set of blocks using a neural network, in other examples, a task may involve the processing of an entire tensor or an entire stripe of a tensor, or the processing of a tensor or part of a tensor using a portion of a neural network rather than an entire neural network. It is to be appreciated that, in further examples, a task need not involve neural network processing and may instead involve a different type of data processing.

Referring back to FIG. 1, a convolution between a four-dimensional array of weights 102 with a three-dimensional tensor 100 may be considered to be a series of nested loops, covering: weight kernel x and y axes, an input channel (iz) axis, output x and y axes and an output channel (oz) axis. The x, y, iz and oz axes are shown schematically in FIG. 1. A block of processing may include some or all of these axes. It is to be appreciated, though, that FIG. 1 is an example for illustration and in practice a convolution may include more or fewer dimensions than this. For example, weights and/or tensors to be convolved with each other may have a different number than three or four dimensions. In an example convolution (such as a convolution of a 3×3 kernel of weights, with a size of 3 in both the x and y dimensions, with a corresponding set of tensor elements), a processing block will include the whole of the weight kernel x and y axes, although this may not be the case for larger weight kernels. The processing block in this example includes a subrange of each of the other axes (although in some other examples, with a smaller convolution, a block may include the entire range of some or all of the other axes).

In a convolution operation in accordance with FIG. 1, weights do not vary along the output x and y axes, so a weight block may be considered to contain the entire output x and y axes. A weight block thus typically contains a subrange of the output and input z axes (labelled herein as oz and iz, respectively) and the entire weight kernel x and y axes and output x and y axes. In this example, weights, and thus weight blocks, are ordered contiguously in memory to match the order in which the blocks of work are to be executed (as determined by the compiler).

In FIG. 1, the tensor 100 to be convolved with the weights 102 (which are e.g. decompressed neural network weights) includes a first set of blocks **104*a* (which in this example are input blocks). In this case, each block of the first set of blocks 104*a* occupies the same x and y regions. However, each block of the first set of blocks 104*a* is at a different position in the iz dimension. The first set of blocks 104*a* includes a first input block 106*a* at a first set of iz positions, a second input block 106*b* at a second set of iz positions, a third input block 106*c* at a third set of iz positions and a fourth input block 106*d* at a fourth set of iz positions. Each of the input blocks 106*a*-106*d* of the first set of blocks 104*a* includes elements at four iz positions, i.e. so that each input block 106*a*-106*d* of the first set of blocks 104*a* covers 4 input channels, giving 16 input channels in total (where the input channel axis corresponds to the iz axis). Each of the input blocks 106*a*-106*d* of the first set of blocks 104*a* may be represented by corresponding tensor data, and may be taken to correspond to a respective part of the (first) set of blocks 104*a*. For example, the first input block 106*a* may be represented by first tensor data and may be taken to correspond to a first part of the first set of blocks 104*a***.

In this example, the weights 102 include four sets of decompressed neural network weight blocks **108*a*-108*d*, which may be referred to merely as sets of weight blocks 108*a*-108*d*. Each set of weight blocks includes four weight blocks. In FIG. 1, solely the weight blocks 110*a*-110*d* of the first set of weight blocks 108*a*** is labelled, for clarity.

Similarly to the blocks of the tensor 100, each weight block of a given set of weight blocks occupies the same x and y regions but a different respective position in the iz dimension. Each weight block may be represented by respective weight data, and may be considered to represent a respective part of a given set of decompressed neural network weight blocks. For example, a first weight block 110*a* of the first set of weight blocks 108*a* may be represented by first weight data, and may be taken to represent a first part of a (first) set of decompressed neural network weight blocks 108*a*.

In FIG. 1, a convolution operation to generate a first output block 112 of an output tensor 114 involves convolving: the first input block 106*a* of the first set of blocks 104*a* with the first weight block 110*a* of the first set of weight blocks 108*a*; the second input block 106*b* of the first set of blocks 104*a* with the second weight block 110*b* of the first set of weight blocks 108*a*; the third input block 106*c* of the first set of blocks 104*a* with the third weight block 110*c* of the first set of weight blocks 108*a*; and the fourth input block 106*d* of the first set of blocks 104*a* with the fourth weight block 110*d* of the first set of weight blocks 108*a*.

In this example, each weight block of the first set of weight blocks 108*a* is thus convolved in turn with a corresponding block of the first set of blocks 104*a* of the tensor 100. To simplify the obtaining of the weight blocks from storage, the weight blocks 110*a*-110*d* may be ordered contiguously in memory, i.e. so that the first weight block 110*a* of the first set of weight blocks 108*a* immediately precedes the second weight block 110*b* of the first set of weight blocks 108*a* in the storage, and so on. Similarly, compressed data representing the first to fourth weight blocks 110*a*-110*b* of the first set of weight blocks 108*a* may be ordered contiguously within a compressed data stream, which may be stored more efficiently than uncompressed weights.

A second output block 116 of the output tensor 114 may be obtained in a corresponding fashion. The second output block 116 covers the same y and oz positions but is at an immediately subsequent x position to the first output block 112. Hence, to obtain the second output block 116, each (input) block 118*a*-118*d* of a second set of (input) blocks 104*b* of the tensor 100 is convolved with a corresponding weight block of the first set of weight blocks 108*a*. In this case, the second set of blocks 104*b* includes blocks 118*a*-118*d* the same y and oz positions but is at an immediately subsequent x position to the first set of blocks 104*a* of the tensor 100. The convolution operation to generate the second output block 116 thus involves convolving: the first input block 118*a* of the second set of blocks 104*b* with the first weight block 110*a* of the first set of weight blocks 108*a*; the second input block 118*b* of the second set of blocks 104*b* with the second weight block 110*b* of the first set of weight blocks 108*a*; the third input block 118*c* of the second set of blocks 104*b* with the third weight block 110*c* of the first set of weight blocks 108*a*; and the fourth input block 118*d* of the second set of blocks 104*b* with the fourth weight block 110*d* of the first set of weight blocks 108*a*.

Third and fourth output blocks of the output tensor 114, at the same y and oz positions but successive x positions to the second output block 116, may be obtained in a corresponding manner, by convolving blocks of third and fourth sets of blocks of the tensor 100, at the same y and oz positions but successive x positions to the second set of blocks 104*b*, with corresponding weight blocks of the first set of weight blocks 108*a*. Similarly, an output block of the output tensor 114 at a subsequent y position but the same x and oz position as the first output block 112 may be obtained in a corresponding way, by convolving blocks of a set of blocks of the tensor 100 at the same x and oz positions but a subsequent y position to the first set of blocks 104*a*, with corresponding weight blocks of the first set of weight blocks 108*a*. The same approach may be applied to obtain the output blocks of the output tensor 114 in the same x-y plane as the first and second output blocks 112, 116. It can thus be seen that the first set of weights 108*a* is re-used many times to obtain these output blocks. It is hence desirable to be able to efficiently re-read particular weights in order to perform processing such as this.

Output blocks in successive x-y planes to the first and second output blocks 112, 116 may be obtained in a similar manner but using successive sets of weight blocks 108*b*-108*d* for each plane. Each of these further sets of weight blocks 108*b*-108*d* may similarly be re-read many times in order to perform this processing. It is to be appreciated that, in practice, a tensor to be processed and/or the weights to be convolved with a particular tensor may be much larger than those shown in FIG. 1.

Figure 2:
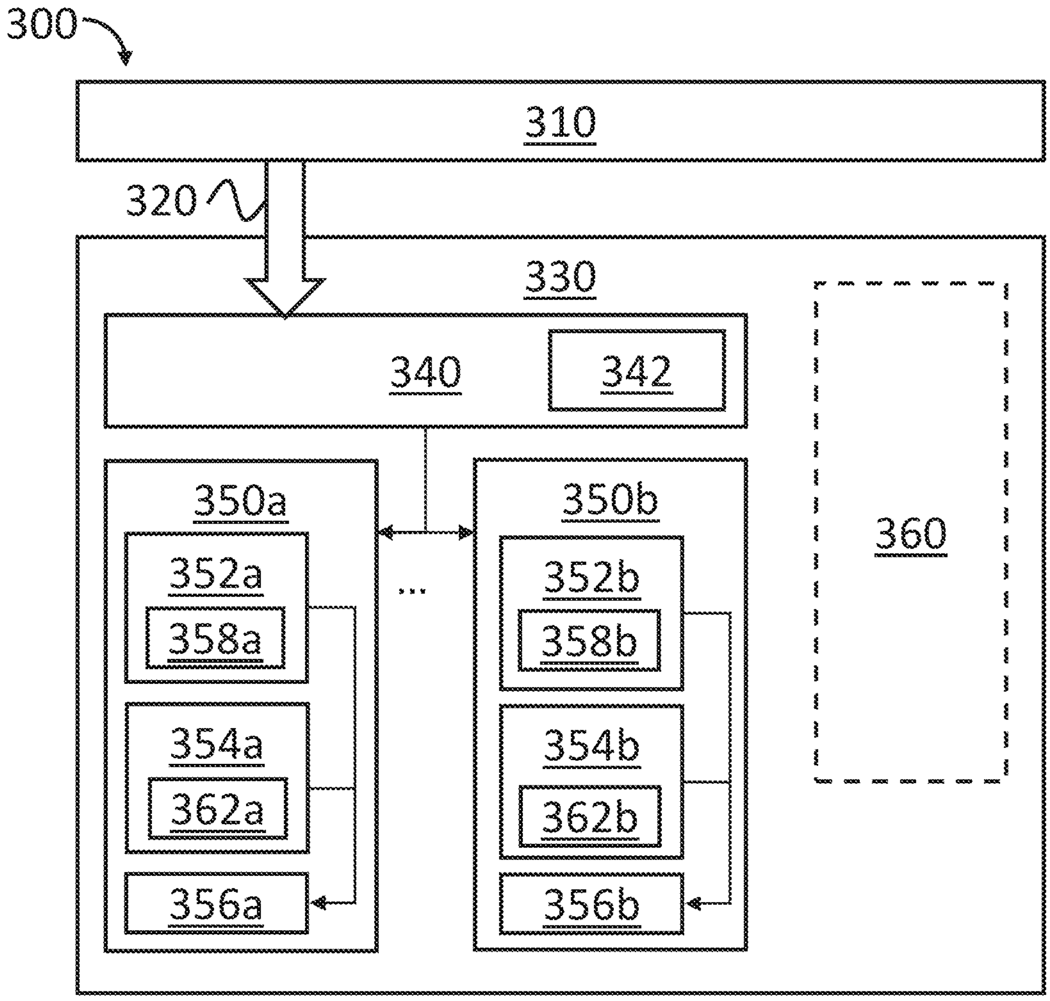
FIG. 2 is a schematic diagram of a data processing system, according to examples.

The methods herein may be implemented using a processor that provides dedicated circuitry that can be used to perform operations which would normally be undertaken by dedicated hardware accelerators, such as a neural processing unit (NPU) and a graphics processing unit (GPU). FIG. 2 shows schematically an example of a data processing system 300 including such a processor 330. It will be appreciated that the types of hardware accelerator which the processor 330 may provide dedicated circuitry for is not limited to that of an NPU or GPU but may be dedicated circuitry for any type of hardware accelerator. GPU shader cores may be well-suited for performing certain types of arithmetic operations such as neural processing operations, as these operations are generally similar to the arithmetic operations that may be required when performing graphics processing work (but on different data). Furthermore, graphics processors typically support high levels of concurrent processing (e.g. supporting large numbers of execution threads), and are optimized for data-plane (rather than control plane) processing, all of which means that graphics processors may be well-suited for performing other types of operations.

That is, rather than using entirely separate hardware accelerators, such as a machine learning processing unit that is independent of the graphics processor, such as an NPU, or only being able to perform machine learning processing operations entirely using the hardware of the GPU, dedicated circuitry may be incorporated into the GPU itself.

This means that the hardware accelerator circuitry incorporated into the GPU is operable to utilize some of the GPU's existing resources (e.g. such that at least some functional units and resource of the GPU can effectively be shared between the different hardware accelerator circuitry, for instance), whilst still allowing an improved (more optimized) performance compared to performing all the processing with general purpose execution.

As such, the processor 330 may be a GPU that is adapted to comprise a number of dedicated hardware resources, such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along the interconnect with other hardware units (e.g. an NPU). In that case, at least some of the machine learning processing work can be offloaded to the machine learning processing circuit, thereby freeing the execution unit to perform actual graphics processing operations, as desired.

In other words, in some examples, providing a machine learning processing circuit within the graphics processor means that the machine learning processing circuit is preferably then operable to perform at least some machine learning processing operations whilst the other functional units of the graphics processor are simultaneously performing graphics processing operations. In the situation where the machine learning processing relates to part of an overall graphics processing task this can therefore improve overall efficiency (in terms of energy efficiency, throughput, etc.) for the overall graphics processing task.

In FIG. 2, the processor 330 is arranged to receive a command stream 320 from a host processor 310, such as a CPU. The command stream comprises at least one command in a given sequence, each command to be executed, and each command may be decomposed into a number of tasks, such as the tasks discussed above. These tasks may be self-contained operations, such as a given machine learning operation or a graphics processing operation. It will be appreciated that there may be other types of tasks depending on the command.

The command stream 320 is sent by the host processor 310 and is received by a command processing unit 340 which is arranged to schedule the commands within the command stream 320 in accordance with their sequence. The command processing unit 340 is arranged to schedule the commands and decompose each command in the command stream 320 into at least one task. Once the command processing unit 340 has scheduled the commands in the command stream 320, and generated a plurality of tasks for the commands, the command processing unit 340 issues each of the plurality of tasks to at least one compute unit 350*a*. 350*b*, each of which are configured to process at least one of the plurality of tasks.

The processor 330 comprises a plurality of compute units 350*a*, 350*b*. Each compute unit 350*a*, 350*b*, may be a shader core of a GPU specifically configured to undertake a number of different types of operations, however it will be appreciated that other types of specifically configured processor may be used, such as a general-purpose processor configured with individual compute units, such as compute units 350*a*, 350*b*. Each compute unit 350*a*, 350*b* comprises a number of components, and at least a first processing module 352*a*, 352*b* for executing tasks of a first task type, and a second processing module 354*a*, 354*b* for executing tasks of a second task type, different from the first task type. In some examples, the first processing module 352*a*, 352*b* may be a processing module for processing neural processing operations, such as those which would normally be undertaken by a separate NPU. In these cases, the first processing module 352*a*, 352*b* is for example a neural engine. Similarly, the second processing module 354*a*, 354*b* may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader takes, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 340 issues tasks of a first task type to the first processing module 352*a*, 352*b* of a given compute unit 350*a*, 350*b*, and tasks of a second task type to the second processing module 354*a*. 354*b* of a given compute unit 350*a*, 350*b*. The command processing unit 340 would issue machine learning/neural processing tasks to the first processing module 352*a*, 352*b* of a given compute unit 350*a*, 350*b* where the first processing module 352*a*, 352*b* is optimized to process neural network processing tasks, for example by comprising an efficient means of handling a large number of multiply-accumulate operations. Similarly, the command processing unit 340 would issue graphics processing tasks to the second processing module 354*a*, 354*b* of a given compute unit 350*a*, 350*b* where the second processing module 352*a*, 354*a* is optimized to process such graphics processing tasks. The convolutions described above with reference to FIG. 1 are examples of neural processing tasks.

In addition to comprising a first processing module 352*a*, 352*b* and a second processing module 354*a*. 354*b*, each compute unit 350*a*, 350*b* also comprises a memory in the form of a local cache 356*a*, 356*b* for use by the respective processing module 352*a*, 352*b*, 354*a*, 354*b* during the processing of tasks. Examples of such a local cache 356*a*, 356*b* is a L1 cache. The local cache 356*a*, 356*b* may, for example, be a synchronous dynamic random-access memory (SDRAM). For example, the local cache 356*a*, 356*b* may comprise a double data rate synchronous dynamic random-access memory (DDR-SDRAM). It will be appreciated that the local cache 356*a*, 356*b* may comprise other types of memory.

The local cache 356*a*, 356*b* is used for storing data relating to the tasks which are being processed on a given compute unit 350*a*, 350*b* by the first processing module 352*a*, 352*b* and second processing module 354*a*, 354*b*. It may also be accessed by other processing modules (not shown) forming part of the compute unit 350*a*. 350*b* the local cache 356*a*, 356*b* is associated with. However, in some examples it may be necessary to provide access data associated with a given task executing on a processing module of a given compute unit 350*a*. 350*b* to a task being executed on a processing module of another compute unit (not shown) of the processor 330. In such examples, the processor 330 may also comprise storage 360, for example a cache, such as an L2 cache, for providing access to data for the processing of tasks being executed on different compute units 350*a*, 350*b*.

By providing a local cache 356*a*, 356*b* tasks which have been issued to the same compute unit 350*a*, 350*b* may access data stored in the local cache 356*a*, 356*b*, regardless of whether they form part of the same command in the command stream 320. The command processing unit 340 is responsible for allocating tasks of commands to given compute units 350*a*. 350*b* such that they can most efficiently use the available resources, such as the local cache 356*a*, 356*b*, thus reducing the number of read/write transactions required to memory external to the compute units 350*a*, 350*b*, such as the storage 360 (L2 cache) or higher level memories. One such example, is that a task of one command issued to a first processing module 352*a* of a given compute unit 350*a*, may store its output in the local cache 356*a* such that it is accessible by a second task of a different (or the same) command issued to a given processing module 352*a*, 354*a* of the same compute unit 350*a*.

The first processing module 352*a*, 352*b* has internal storage 358*a*, 358*b*, which is for example a buffer for storing data internally to the first processing module 352*a*, 352*b* during performance of a task by the first processing module 352*a*, 352*b*. The second processing module 354*a*, 354*b* similarly has internal storage 362*a*, 362*b*, which is also for example a buffer.

One or more of the command processing unit 340, the compute units 350*a*, 350*b*, and the storage 360 may be interconnected using a bus. This allows data to be transferred between the various components. The bus may be or include any suitable interface or bus. For example, an ARM® Advanced Microcontroller Bus Architecture (AMBAR) interface, such as the Advanced extensible Interface (AXI), may be used.

As explained above, a processing operation, such as a neural network processing operation like that of FIG. 1, may be divided into jobs, e.g. each corresponding to processing of a stripe of a tensor. Each job may then be divided into a plurality of tasks, each involving the processing of a different set of blocks of the stripe of the tensor corresponding to that particular job. Each task may be executed independently of each other. For example, tasks may be executed at least partly in parallel on different cores of a multi-core processor. In some examples, each task of a given job involves the execution of the same program (e.g. defined by a program description), but applied to different input data (in this case, a different spatial subrange of a tensor, e.g. representing a feature map).

Each task typically involves processing spanning the entirety of at least one reduction axis (which is an axis that exists in an input to the processing but does not exist in the output). For the convolutions shown in FIG. 1, the input channel (iz) and weight kernel x and y axes are reduction axes, so a typical task covers the entirety of the input channel (iz) and weight kernel x and y axes for a particular job (although this need not always be the case). Hence, a task of a given job typically covers only a subrange of the output channel (oz) axis, the output x axis and/or the output y axis for that particular job. It is to be appreciated, though, that a given job may not contain the total input channel (iz) and weight kernel x and y axes, as typically the work to be performed is divided into a plurality of jobs, each corresponding to a subrange of these axes.

As explained above, the command processing unit 340 of FIG. 2 receives the command stream 320 from the host processor 310, which for example includes a command indicative of a job to be executed. The command processing unit 340 splits the job into tasks, which are issued to the at least one compute unit 350*a*, 350*b*. The command processing unit 340 for example includes an iterator 342, which may be implemented in hardware (e.g. using appropriately configured circuitry), to handle the division of jobs into tasks. The command stream 320 includes a job execution call, which is a call to the iterator 342 including various arguments for use in splitting jobs into tasks. For example, the arguments may include a bounding box specifying an extent of the job, e.g. defining the extent of the stripe of the tensor to be processed to execute the job. The arguments may also or instead include an indication of at least one axis to be iterated over to execute the job. For example, if the job has a four dimensional bounding box, the arguments may include an inner axis choice, indicating a dimension within the four dimensional bounding box to be iterated over in an inner loop of a two-loop process, and an outer axis choice, indicating another dimension within the four dimensional bounding box to be iterated over in an outer loop of the two-loop process. The arguments may also or instead include a task size for splitting the bounding box into tasks, and/or program location data indicative of a location in storage (such as the L2 cache 360) of a compiled program to be executed by a processing module of at least one compute unit 350*a*, 350*b* in executing a task. For example, the program location data may be a pointer to a job program to execute on each task of the job, according to the inner and outer axis choices and the task size.

In examples, the compiled program includes array location data indicative of a location in a storage system of an array of data descriptors. For example, the array location data may be a pointer to an array of data descriptors. Each of the data descriptors has a predetermined size and is indicative of a location in the storage system of a respective portion of data. The storage system may include one or more different storage components, and different type of data may be stored in the same or different storage components. For example, the array of data descriptors and the data itself may be stored in the same or different storage components of the storage system. In the example of FIG. 2, the storage system includes the L2 cache 360 and a dynamic random access memory (DRAM), which is not shown in FIG. 2. In further examples, the storage system may also include the local cache 356*a*, 356*b* of the compute units 350*a*, 350*b*. The data is stored in the L2 cache 360 in FIG. 2, but this is merely an example. In examples, the array of data descriptors is an array of weight stream descriptors (WSDs), and each WSD contains a pointer to corresponding weight data representing weights, such as a pointer to a particular compressed data stream representing the weights. The WSDs are less likely to be cached in the L2 cache 360 in this example because the WSDs are likely to be different for each task (although in some cases different tasks may involve processing of the same weight data, and may hence be associated with the same WSD). A given WSD for a particular task thus may not have been allocated to the L2 cache 360 by a previous task. If the given WSD has not already been cached in the L2 cache 360 it must instead be fetched from a different storage component such as the DRAM.

In examples, the iterator 342 splits jobs into tasks so that each task covers a different subrange of an output channel (oz) axis. In this case, if the job execution call includes an inner and outer axis choice, one of the inner and outer axes will thus correspond to the output channel (oz) axis. If the job involves the convolution of the tensor 100 of FIG. 1 with corresponding weights, each task will involve the convolution of input blocks of the tensor 100 with a different respective set of weight blocks 108*a*-108*d*.

To facilitate access to the correct weights for a particular task, the job execution call for example includes an additional parameter: a weight dimension choice (which in this example may be none, inner or outer). This parameter instructs the iterator 342 to increment a counter each time the iterator 342 begins execution of a new task along the dimension indicated by the weight dimension choice parameter. For example, where the iterator 342 divides a job into tasks each covering a different subrange of the output channel (oz) axis, and the inner axis is indicated as corresponding to the output channel (oz) axis, the weight dimension choice can be used to indicate that the inner axis has been selected. In this example, each time the iterator 342 commences a new task along the inner axis (i.e. along the output channel (oz) axis), the iterator 342 increments a counter. The value of the counter for execution of a particular task may be considered to correspond to a task-based parameter associated with that particular task. The task-based parameter may then be used to determine a position within the array of WSDs of a WSD of a set of weight blocks to be processed to execute that particular task.

As explained above, in some cases, the job may not contain the whole of the output channel (oz) axis. To simplify access to the appropriate weight blocks, e.g. in such cases, the job execution call may also include a further parameter: a weight dimension starting offset. The weight dimension starting offset may be considered to be a job-based parameter, which is for example representative of a job start position within the array, of a data descriptor of a portion of data to be processed to start execution of the job. For example, the job-based parameter may be considered to correspond to a starting offset for a particular job, which is an initial value of the counter prior to incrementation by the iterator 342. In other words, rather than starting from zero, the counter may take an initial value corresponding to the weight dimension starting offset for a particular job, and may then be incremented by the iterator 342 as subsequent tasks are performed. For example, different jobs may have different job-based parameters, e.g. corresponding to different weight dimension starting offsets. This for example allows the same program description to be used for each job and each task.

The command processing unit 340 issues the task to at least one of the compute units 350*a*, 350*b*, e.g. to one of the first or second processing modules 352*a*, 352*b*, 354*a*, 354*b*. The task for example includes the program location data indicative of a location in the storage system (in this case the L2 cache 360) of the compiled program to be executed in executing the task, as well as the task-based parameter associated with the task (which is for example the value of the counter as calculated by the iterator 342).

Figure 3:
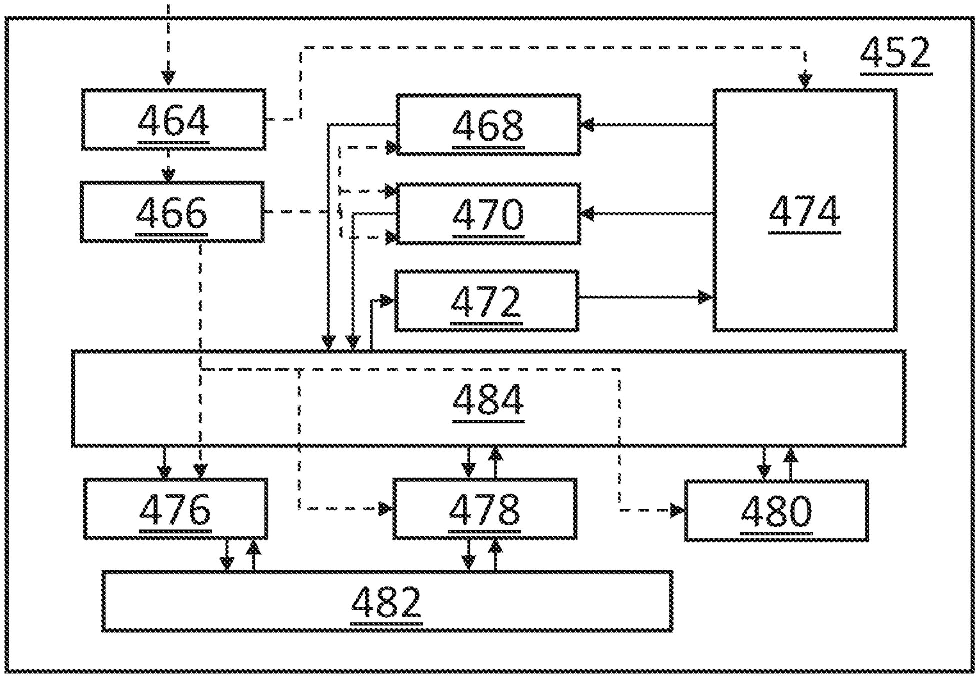
FIG. 3 is a schematic diagram of a neural engine, according to examples.

In examples, the task is a neural processing task issued to a neural engine, which is an example of the first processing module 352*a*. 352*b*. FIG. 3 is a schematic diagram of a neural engine 452, according to examples. The neural engine 452 includes a command and control module 464. The command and control module 464 receives tasks from the command processing unit 340 (shown in FIG. 2), and also acts as an interface to a storage system external to the neural engine 452 (which may include storage components such as a local cache 356*a*, 356*b*, a L2 cache 360 and/or a DRAM) which is arranged to store data to be processed by the neural engine 452 such as data representing a tensor or a stripe of a tensor, or data representing neural network weights. The data may comprise compressed data, e.g. representing neural network weights as described with reference to FIGS. 1 and 2. The external storage may additionally store other data to configure the neural engine 452 to perform particular processing and/or data to be used by the neural engine 452 to implement the processing. For example, the storage system or a component thereof, e.g. the DRAM, may store an array of data descriptors.

The command and control module 464 interfaces to a handling unit 466, which is for example a traversal synchronization unit (TSU). In this example, each task corresponds to a stripe of a tensor, which is to be convolved with weights to implement a layer of a neural network. In this example, the handling unit 466 splits data representing a stripe of a tensor into a plurality of blocks of data, each of which represents a respective part of the tensor. The handling unit 466 also obtains, from storage external to the neural engine 452 such as the L2 cache 360, an operation set comprising a plurality of operations. In this example, the operations are a chain of operations, representing a sequence of layers of the neural network. A block of data is allocated as an input to one of the operations by the handling unit 466.

In the example of FIG. 3, the handling unit 466 obtains the program location data from the task, which is e.g. a pointer to a compiled program (stored in the L2 cache 360 in this example) to be executed in executing the task. The handling unit 466 of FIG. 3 then obtains the compiled program from the L2 cache 360, based on the program location data. In other examples, though, the program location data may be stored in other storage than the L2 cache 360. The compiled program in this example includes array location data indicative of a location of a predetermined data descriptor of an array of data descriptors (which in this case is an array of WSDs). The array location data in this example is a pointer to an address in storage system of a first WSD of the array of WSDs (which may be considered to be a base WSD). It is to be appreciated that the address of the first WSD would be the same in the DRAM and in the L2 cache 360, so that the same pointer can be used to first attempt to obtain the first WSD (or another WSD, offset from the first WSD) from the L2 cache 360 and then from the DRAM (if the first or other WSD has not yet been cached in the L2 cache 360).

The handling unit 466 determines a position within the array of the WSDs of a WSD for weight data to be processed to execute the task, based on the task-based parameter. For example, if the task is a first task in a job, the counter (which corresponds to the task-based parameter) may take a value of 0. In this case, the WSD for the first task may be taken to correspond to the WSD at position 0 within the array. If the task is a second task in the job, immediately subsequent to the first task, the counter may take a value of 1. In this case, the WSD for the second task may be taken to correspond to the WSD at position 1 within the array, and so on.

The position of a WSD within the array can be used, in conjunction with the array location data, to identify the actual location of the WSD in the storage system. For example, if each of the WSDs has a predetermined size (such as a fixed size, e.g. of 32 bytes) and a first WSD of the array starts at a first address within the storage, a second WSD of the array, at a second position immediately following a first position of the first WSD within the array, will start at a second address within the storage system corresponding to the first address plus 32 bytes. Similarly, a third WSD of the array, at a third position immediately following the second position, will start at a third address within the storage system corresponding to the first address plus 64 bytes. As explained above, the address would be the same irrespective of which storage component the WSD is stored in, so that the same address can be used to obtain the WSD from e.g. the L2 cache 360 or from the DRAM (if the WSD hasn't yet been cached in the L2 cache 360).

On this basis, the location of a particular WSD for a particular task can be determined by the handling unit 466. The handling unit 466 can then control the obtaining of the particular WSD from the storage system (e.g. via one or more other components of the neural engine 452 such as a direct memory access (DMA) unit 474). The WSD 360 obtained by the neural engine 452 may be cached, such as within the L2 cache 360 and/or within the neural engine 452 such as within a cache of the command and control module 464 (not shown in FIG. 3).

The WSD is indicative of a location in a storage system of a portion of data corresponding to a set of weight blocks in this example. The data may be compressed data. For example, there may be a compressed data stream representing a plurality of sets of weight blocks, e.g. each corresponding to a respective portion of the compressed data stream. In such cases, the WSD may include a pointer to point to a position within the compressed data stream corresponding to a start of weight data representing the set of weight blocks.

In other examples, each set of weight blocks may be compressed as a separate compressed data stream. For example, as the determination of the job and task size may be made by the compiler at the same time as the weight blocks are compressed, the compiler can compress each set of weight blocks, e.g. each corresponding to a different respective task, as separate compressed data streams. This can simplify access to the appropriate set of weight blocks, as it removes the need to access sets of weight blocks that start in the middle of a compressed data stream (which can be difficult to locate, e.g. if the compressed data stream is compressed using a variable encoding rate). For example, in these cases, each set of weight blocks, corresponding to a different respective compressed data stream, may be associated with a different respective WSD. The WSD for a particular set of weight blocks for example includes a pointer to the compressed data stream for that set of weight blocks. As explained above, the WSDs may be stored as a contiguous array in a storage system so that a particular WSD can be obtained from the location in the storage system based on a predetermined position within the array (such as a base of the WSD array), a task-based parameter and, in some cases, a job-based parameter.

The handling unit 466 coordinates the interaction of internal components of the neural engine 452, which include the weight fetch unit 468, an input reader 470, an output writer 472, the DMA unit 474, a dot product unit (DPU) array 476, a vector engine 478, a transform unit 480, an accumulator buffer 482, and the storage 484, for processing of blocks of data. The data dependencies across the functional units are tracked by the handling unit 466. Processing is initiated by the handling unit 466 in a functional unit if all input blocks are available and space is available in the storage 484 of the neural engine 452. The storage 484 may be considered to be a shared buffer, in that various functional units of the neural engine 452 share access to the storage 484.

In examples in which the data to be processed represents weights, the weight fetch unit 468 fetches respective portions of data upon execution of the compiled program by the handling unit 466. For example, a portion of data may be compressed data representing a set of weight blocks for a particular task of a particular job, which may be obtained from storage external to the handling unit 466 (such as the L2 cache 360 or the local cache 356*a*, 356*b*) based on the WSD for that task and job. In these examples, the weight fetch unit 468 may decompress the portion of the data to generate decompressed data (e.g. if the portion of the data is compressed data). At least part of the decompressed data, e.g. representing at least part of a set of weight blocks, may then be stored in the storage 484. The weight fetch unit 468 for example includes a suitable decompression unit (not shown in FIG. 3) to decompress received portions of the compressed data stream.

The input reader 470 reads further data to be processed by the neural engine 452 from external storage, such as a block of data representing part of a tensor. The output writer 472 writes output data obtained after processing by the neural engine 452 to external storage, such as output data representing at least part of an output feature map obtained by processing a corresponding at least part of an input feature map by the neural network represented by the weights fetched by the weight fetch unit 468. The weight fetch unit 468, input reader 470 and output writer 472 interface with external storage (such as the local cache 356*a*, 356*b*, which may be a L1 cache such as a load/store cache, the L2 cache 360 and/or the DRAM) via the DMA unit 474.

The weights and block(s) of data are processed by the DPU array 476, vector engine 478 and transform unit 480 to generate the output data which is written out to external storage (such as the local cache 356*a*, 356*b*, the L2 cache 360 and/or the DRAM) by the output writer 472. The DPU array 476 is arranged to efficiently calculate a dot product between two operands, such as between an array of weights and a corresponding block of data (e.g. representing part of a tensor). The vector engine 478 is arranged to perform elementwise operations, for example to apply scale parameters to scale an output of a dot product calculated by the DPU array 476. Data generated during the course of the processing performed by the DPU array 476 and the vector engine 478 is stored temporarily in the accumulator buffer 482, from where it may be retrieved by either the DPU array 476 or the vector engine 478 for further processing as desired.

The transform unit 480 is arranged to perform in-block transforms such as dimension broadcasts or axis swaps. The transform unit 480 obtains data from the storage 484 (e.g. after processing by the DPU array 476 and/or vector engine 478) and writes transformed data back to the storage 484.

Figure 4:
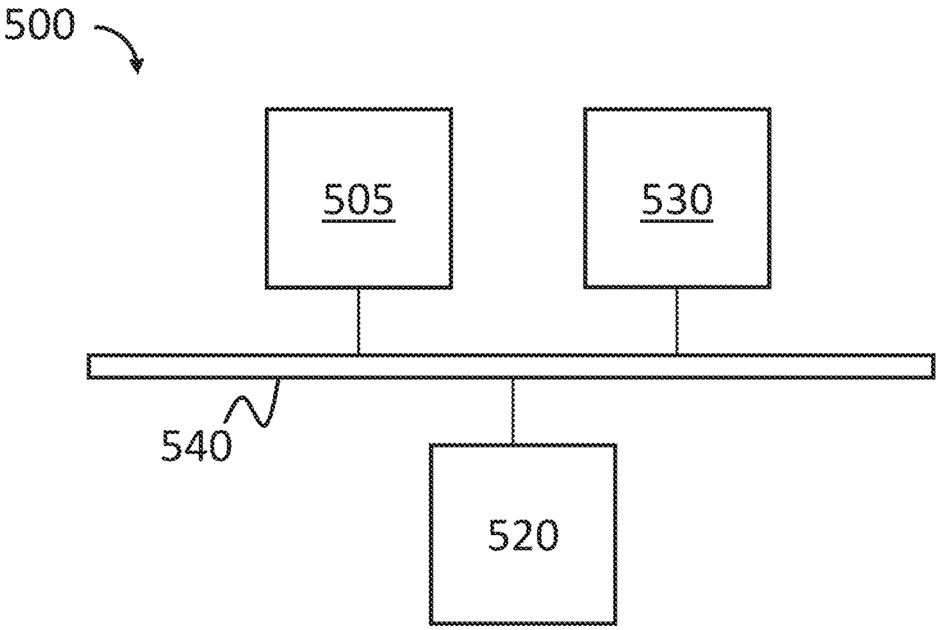
FIG. 4 is a schematic diagram of a system comprising features according to examples.

FIG. 4 shows schematically a system 500 for allocating tasks associated with commands in a sequence of commands.

The system 500 comprises host processor 505 such as a central processing unit, or any other type of general processing unit. The host processor 505 issues a command stream comprising a plurality of commands, each having a plurality of tasks associated therewith.

The system 500 also comprises a processor 530, which may be similar to or the same as the processor 330 of FIG. 2. The processor 530 comprises at least a plurality of compute units 350*a*, 350*b* and a command processing unit 340. Each compute unit may comprise a plurality of processing modules each configured to perform at least one type of operation. The system 500 may also include at least one further processor (not shown), which may be the same as the processor 530. The processor 530, and the host processor 505 may be combined as a System on Chip (SoC) or onto multiple SoCs to form one or more application processors.

The system 500 also comprises memory 520 for storing data generated by the tasks externally from the processor 530, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 350*a*. 350*b* of a processor 530 so as to maximize the usage of the local cache 356*a*, 356*b*.

In some examples, the system 500 may comprise a memory controller (not shown), which may be a dynamic memory controller (DMC). The memory controller is coupled to the memory 520. The memory controller is configured to manage the flow of data going to and from the memory. The memory may comprise a main memory, otherwise referred to as a 'primary memory'. The memory may be an external memory, in that the memory is external to the system 500. For example, the memory 520 may comprise 'off-chip' memory. The memory may have a greater storage capacity than local caches of the processor 530 and/or the host processor 505. In some examples, the memory 520 is comprised in the system 500. For example, the memory 520 may comprise 'on-chip' memory. The memory 520 may, for example, comprise a magnetic or optical disk and disk drive or a solid-state drive (SSD). In some examples, the memory 520 comprises a synchronous dynamic random-access memory (SDRAM). For example, the memory 520 may comprise a double data rate synchronous dynamic random-access memory (DDR-SDRAM).

One or more of the host processor 505, the processor 530, and the memory 520 may be interconnected using a system bus 540. This allows data to be transferred between the various components. The system bus 540 may be or include any suitable interface or bus. For example, an ARM® Advanced Microcontroller Bus Architecture (AMBAR) interface, such as the Advanced extensible Interface (AXI), may be used.

The above examples are to be understood as illustrative examples. Further examples are envisaged. Although the examples above are described with reference to processing of data to implement a neural network, it is to be appreciated that these examples are merely illustrative, and the methods herein may be used in the processing of data of various types and/or in the performance of various other types of processing, different from neural network processing.

As explained further above, it is to be appreciated that references herein to storage to store data and an array of data descriptors may refer to a storage system including a plurality of components, such as a storage system including an L1 cache and an L2 cache. In such cases, the data and the array of data descriptors may be stored in the same or a different component of the storage system.

The example of FIG. 2 includes a processor 330 that provides dedicated circuitry that can be used to perform operations which would normally be undertaken by dedicated hardware accelerators, such as a neural processing unit (NPU) and a graphics processing unit (GPU). However, in other examples, the methods herein may be implemented using a different processor, such as a processor providing dedicated circuitry to perform the methods herein. For example, the methods herein may be implemented using an appropriately configured hardware accelerator, such as an NPU or a GPU, dedicated to performing a particular type of task.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A processor to:

receive a task to be executed, the task comprising a task-based parameter associated with the task, for use in determining a position, within an array of data descriptors, of a particular data descriptor of a particular portion of data to be processed in executing the task, wherein each of the data descriptors in the array of data descriptors has a predetermined size and is indicative of a location in a storage system of a respective portion of data, and wherein the task comprises program location data indicative of a location in the storage system of a compiled program to be executed by the processor in executing the task;

derive, based on the task, array location data indicative of a location in the storage system of a predetermined data descriptor of the array;

obtain the particular data descriptor from the storage system, based on the array location data and the task-based parameter;

obtain the particular portion of data from the storage system, based on the particular data descriptor; and process the particular portion of data in executing the task, wherein the processor is to re-use the compiled program in executing a plurality of jobs, each comprising processing a different respective section of data stored in the storage system.

2. The processor of claim 1, wherein the processor is to execute a plurality of tasks comprising the task, each task comprising processing of a different respective portion of data, each respective portion of data represented by a data descriptor at a different respective position within the array, and the task-based parameter is representative of the position within the array of the particular data descriptor of the particular portion of data to be processed in executing the task.

3. The processor of claim 1, comprising a command processing unit to:

divide a job to be executed into a plurality of tasks comprising the task;

determine a job-based parameter associated with the job, for use in conjunction with the task-based parameter in determining the position within the array of the particular data descriptor of the particular portion of data to be processed in executing the task; and issue the task to a processing module of the processor, the task further comprising the job-based parameter, wherein the processing module is to obtain the particular data descriptor from the storage system based on the array location data, the task-based parameter, and the job-based parameter.

4. The processor of claim 3, wherein the processor is to execute a plurality of jobs comprising the job, each job comprising processing of a different respective section of the data, each respective section of the data corresponding to a respective task of the plurality of tasks and comprising a different set of portions of data, wherein each set of portions of data is represented by a set of data descriptors at a different respective set of positions within the array, and the job-based parameter is representative of a job start position within the array of a data descriptor of a portion of data to be processed to start execution of the job.

5. The processor of claim 4, wherein the task-based parameter is representative of an index of the task in the plurality of tasks of the job.

6. The processor of claim 5, wherein, to obtain the particular data descriptor from the storage system, the processing module is to determine the position within the array of the particular data descriptor of the particular portion of data by combining the job start position with the index.

7. The processor of claim 3, where the command processing unit is to:

receive, from a host processor, a command to cause the job to be executed, the command comprising:

a first parameter for determining the task-based parameter;

a second parameter for determining the job-based parameter.

8. The processor of claim 3, wherein the processing module is a first processing module for executing tasks of a first task type generated by the command processing unit and the processor comprises:

a plurality of compute units, wherein at least one of the plurality of compute units comprises:

the first processing module;

a second processing module for executing tasks of a second task type, different from the first task type, generated by the command processing unit; and a local cache shared by at least the first processing module and the second processing module, wherein the command processing unit is to issue the plurality of tasks to at least one of the plurality of compute units, and the at least one of the plurality of compute units is to process at least one of the plurality of tasks.

9. The processor of claim 8, wherein the first task type is a task for undertaking at least a portion of a graphics processing operation forming one of a set of pre-defined graphics processing operations which collectively enable the implementation of a graphics processing pipeline, and wherein the second task type is a task for undertaking at least a portion of a neural processing operation.

10. The processor of claim 1, wherein the processor comprises a plurality of processor cores, each to execute a different task of a plurality of tasks comprising the task, each of the plurality of tasks comprising processing of a different respective portion of data, each respective portion of data represented by a data descriptor at a different respective position within the array.

11. The processor of claim 1, wherein the particular portion of data is a particular portion of compressed data, and the processor is to decompress the particular portion of data obtained from the storage system.

12. The processor of claim 1, wherein the task comprises at least a portion of a neural processing operation.

13. The processor of claim 12, wherein the particular portion of data comprises weight data representing neural network weights.

14. The processor of claim 1, wherein the processor is to:

obtain the compiled program from the storage system, based on the program location data; and obtain the array location data from the compiled program.

15. A computer-implemented method comprising:

dividing a job to be executed into a plurality of tasks comprising a task to be executed, the task comprising a task-based parameter associated with the task, for use in determining a position, within an array of data descriptors, of a particular data descriptor of a particular portion of data to be processed in executing the task, wherein each of the data descriptors in the array of data descriptors has a predetermined size and is indicative of a location in a storage system of a respective portion of data;

deriving, based on the task, array location data indicative of a location in the storage system of a predetermined data descriptor of the array;

determining a job-based parameter associated with the job;

issuing the task to a processing module, the task further comprising the job-based parameter;

obtaining, by the processing module, the particular data descriptor from the storage system, based on the array location data, the task-based parameter and the job-based parameter;

obtaining, by the processing module, the particular portion of data from the storage system, based on the particular data descriptor; and processing, by the processing module, the particular portion of data in executing the task.

16. The computer-implemented method of claim 15, wherein the processor is to execute a plurality of tasks comprising the task, each task comprising processing of a different respective portion of data, each respective portion of data represented by a data descriptor at a different respective position within the array, and the task-based parameter is representative of the position within the array of the particular data descriptor of the particular portion of data to be processed in executing the task.

17. The computer-implemented method of claim 15, wherein the task comprises program location data indicative of a location in the storage system of a compiled program to be executed by the processing module in executing the task, and the method comprises:

obtaining, by the processing module, the compiled program from the storage system, based on the program location data; and obtaining, by the processing module, the array location data from the compiled program.

18. A processor to:

receive a task to be executed, the task comprising a task-based parameter associated with the task, for use in determining a position, within an array of data descriptors, of a particular data descriptor of a particular portion of data to be processed in executing the task, wherein each of the data descriptors in the array of data descriptors has a predetermined size and is indicative of a location in a storage system of a respective portion of data;

derive, based on the task, array location data indicative of a location in the storage system of a predetermined data descriptor of the array;

obtain the particular data descriptor from the storage system, based on the array location data and the task-based parameter;

obtain the particular portion of data from the storage system, based on the particular data descriptor; and process the particular portion of data in executing the task, wherein the processor comprises a plurality of processor cores, each to execute a different task of a plurality of tasks comprising the task, each of the plurality of tasks comprising processing of a different respective portion of data, each respective portion of data represented by a data descriptor at a different respective position within the array.

19. The processor of claim 18, comprising a command processing unit to:

divide a job to be executed into the plurality of tasks comprising the task;

determine a job-based parameter associated with the job, for use in conjunction with the task-based parameter in determining the position within the array of the particular data descriptor of the particular portion of data to be processed in executing the task; and issue the task to a processor core of the plurality of processor cores, the task further comprising the job-based parameter, wherein the processor core is to obtain the particular data descriptor from the storage system based on the array location data, the task-based parameter, and the job-based parameter.

20. The processor of claim 19, wherein the processor is to execute a plurality of jobs comprising the job, each job comprising processing of a different respective section of the data, each respective section of the data corresponding to a respective task of the plurality of tasks and comprising a different set of portions of data, wherein each set of portions of data is represented by a set of data descriptors at a different respective set of positions within the array, and the job-based parameter is representative of a job start position within the array of a data descriptor of a portion of data to be processed to start execution of the job.

* * * * *